(12) United States Patent
Flynn-Robitaille

(10) Patent No.: US 11,708,147 B2
(45) Date of Patent: *Jul. 25, 2023

(54) AIRCRAFT WITH DISPLACEABLE CONTROL SURFACE

(71) Applicant: Textron Innovations Inc., Providence, RI (US)

(72) Inventor: Pascal Flynn-Robitaille, Laval (CA)

(73) Assignee: Textron Innovations Inc., Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/557,981

(22) Filed: Dec. 21, 2021

(65) Prior Publication Data

US 2022/0111949 A1 Apr. 14, 2022

Related U.S. Application Data

(63) Continuation of application No. 16/661,740, filed on Oct. 23, 2019, now Pat. No. 11,235,856.

(51) Int. Cl.
| | |
|---|---|
| *B64C 9/08* | (2006.01) |
| *B64C 13/38* | (2006.01) |
| *B64C 29/02* | (2006.01) |

(52) U.S. Cl.
CPC ............. *B64C 9/08* (2013.01); *B64C 13/38* (2013.01); *B64C 29/02* (2013.01)

(58) Field of Classification Search
CPC ........... B64C 9/08; B64C 13/38; B64C 29/02; B64C 3/40; B64C 25/32; Y02T 50/10
See application file for complete search history.

(56) References Cited

U.S. PATENT DOCUMENTS

| | | | | |
|---|---|---|---|---|
| 3,081,964 | A * | 3/1963 | Quenzler | B64C 29/0033 244/54 |
| 3,181,810 | A * | 5/1965 | Olson | B64C 29/0033 244/66 |
| 3,350,035 | A * | 10/1967 | Schlieben | B64C 29/02 244/7 R |
| 8,505,846 | B1 * | 8/2013 | Sanders, II | B64C 11/003 244/7 B |
| 8,646,720 | B2 * | 2/2014 | Shaw | B64C 27/20 244/17.23 |
| 9,120,560 | B1 * | 9/2015 | Armer | B64C 29/0025 |
| D751,491 | S * | 3/2016 | Chen | D12/326 |
| 9,821,909 | B2 * | 11/2017 | Moshe | B64C 27/22 |
| 10,011,351 | B2 * | 7/2018 | McCullough | B64C 25/04 |
| 2003/0094537 | A1 * | 5/2003 | Austen-Brown | B64C 29/0033 244/7 R |

(Continued)

*Primary Examiner* — Justin M Benedik
(74) *Attorney, Agent, or Firm* — Lightfoot & Alford PLLC

(57) ABSTRACT

An aircraft includes a wing and a rotor pod mounted to the wing. The rotor pod includes a body having a forward end and an aft end. A propeller is mounted to the body of the rotor pod at the forward end. A control surface is mounted to the body of the rotor pod between the forward and aft ends and extends outwardly from the body. The control surface is displaceable relative to the body between a first control configuration and a second control configuration to control an attitude of the aircraft. The control surface in the first control configuration is closer to the propeller than the control surface in the second control configuration.

20 Claims, 3 Drawing Sheets

(56) References Cited

U.S. PATENT DOCUMENTS

| | | | |
|---|---|---|---|
| 2008/0065401 A1* | 3/2008 | Abrahamson | G06Q 30/018 |
| | | | 705/317 |
| 2014/0097290 A1* | 4/2014 | Leng | B64C 11/46 |
| | | | 244/6 |
| 2015/0298788 A1* | 10/2015 | Wang | B64C 1/061 |
| | | | 244/17.23 |
| 2016/0214712 A1* | 7/2016 | Fisher | G05D 1/0858 |
| 2017/0334557 A1* | 11/2017 | Alber | B64C 29/02 |
| 2018/0002026 A1* | 1/2018 | Oldroyd | B64C 29/0033 |

* cited by examiner

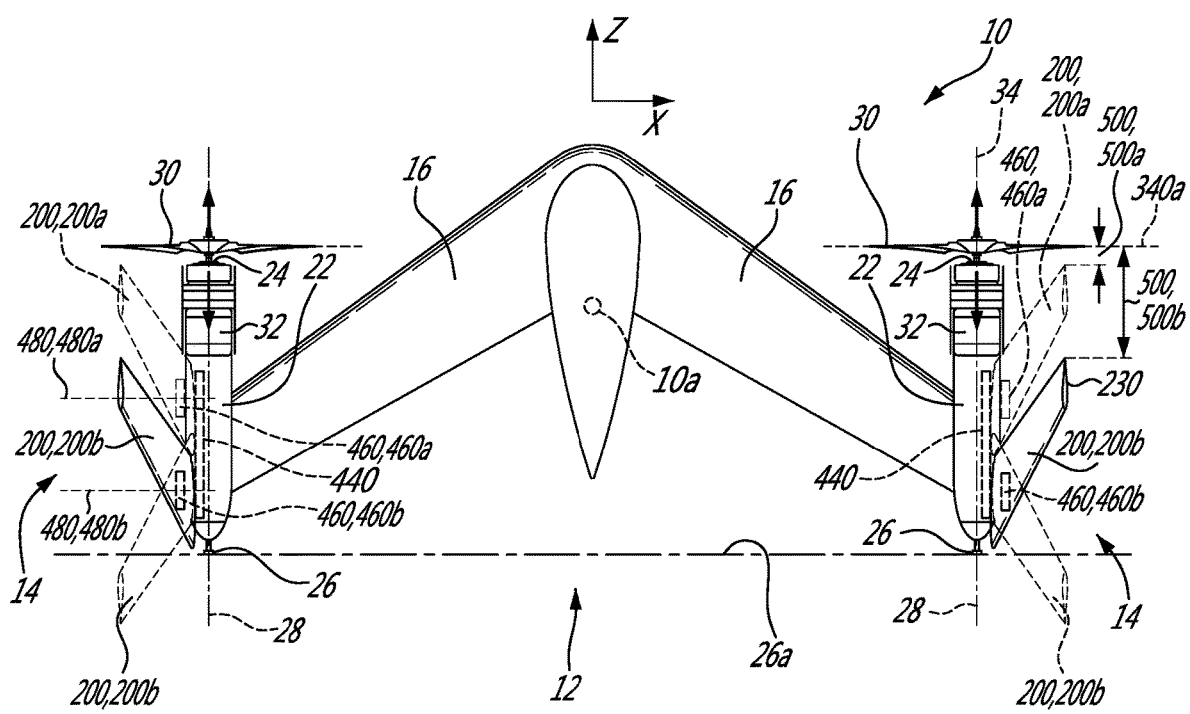

AIRCRAFT WITH DISPLACEABLE CONTROL SURFACE

CROSS-REFERENCE TO RELATED APPLICATIONS

This patent application is a continuation of U.S. patent application Ser. No. 16/661,740, filed on Oct. 23, 2019, the entire contents of which are hereby incorporated by reference.

TECHNICAL FIELD

The application relates generally to aircraft and, more particularly, to aircraft with control surfaces displaceable for controlling an attitude of the aircraft.

BACKGROUND

Aircraft are typically equipped with movable control surfaces aerodynamically configured to control attitude when airborne. For instance, control surfaces are used on fixed-wing types of aircraft to induce movement thereof about each of three axes. Conventionally, such aircraft are orientable about a longitudinal axis extending between a front and a rear, a transverse axis from one side to the other, for example from wingtip to wingtip, and a vertical axis extending between a bottom of the aircraft and its top.

Some aircraft are designed to be controllable such that, in flight, the longitudinal axis is oriented vertically, for example during a hovering manoeuvre. In some such aircraft, control surfaces configured to be tilted to control a pitch or a roll of the aircraft in forward flight are incapable of effectively controlling the attitude of the aircraft during hovering.

SUMMARY

There is disclosed an aircraft, comprising: a wing; a rotor pod mounted to the wing, the rotor pod including a body having a forward end and an aft end, and extending along a longitudinal pod axis; a propeller mounted to the body of the rotor pod at the forward end; and a control surface mounted to the body of the rotor pod between the forward and aft ends and extending outwardly from the body, the control surface being displaceable relative to the body between a first control configuration and a second control configuration, the control surface being further from the propeller in the second control configuration than in the first control configuration, the control surface being rotatable relative to the body.

There is disclosed a method of operating an aircraft including a wing and a rotor pod mounted to the wing, the rotor pod having a body with a forward end and an aft end and a longitudinal pod axis, a propeller mounted to the body at the forward end and a control surface mounted to the body between the forward and aft ends and extending outwardly from the body, the method comprising: displacing the control surface relative to the body between a first control configuration and a second control configuration, the control surface in the first control configuration being closer to the propeller than the control surface in the second control configuration.

DESCRIPTION OF THE DRAWINGS

Reference is now made to the accompanying figures in which:

FIG. 5 is a top plan view of an aircraft of FIG. 1 showing control surfaces in first and second control configurations.

DETAILED DESCRIPTION

Figure 1:
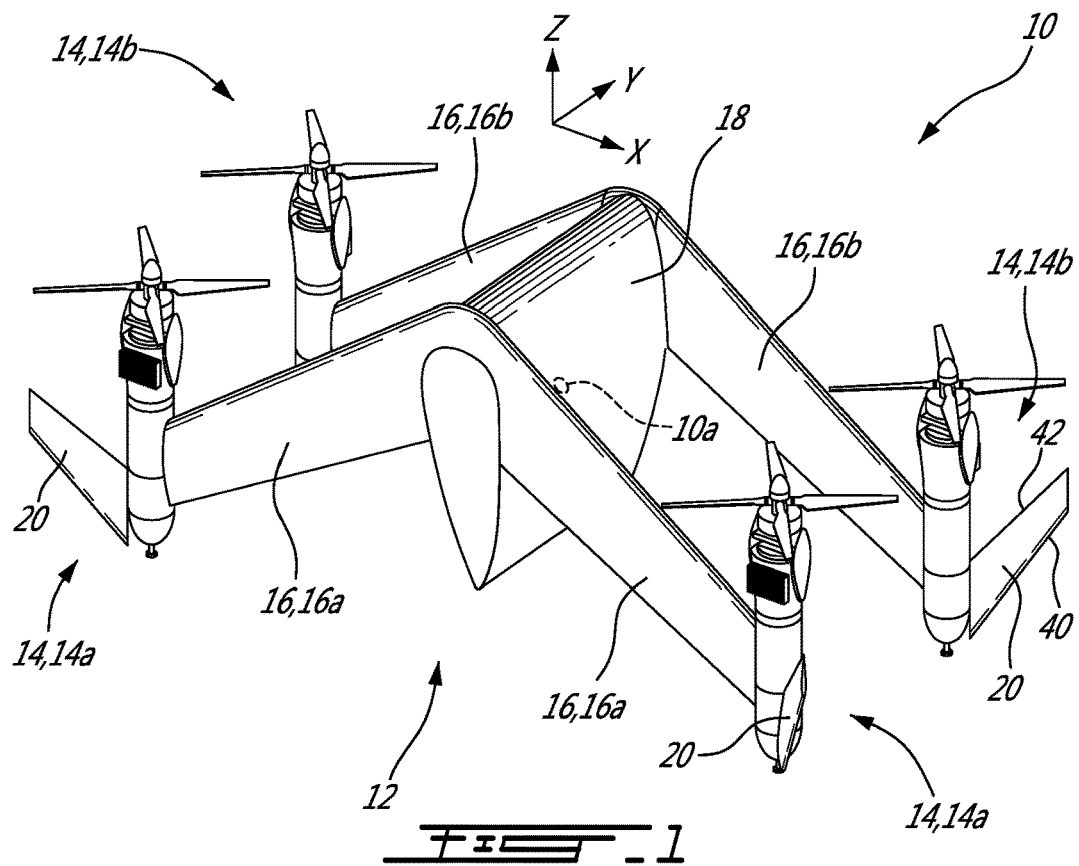
FIG. 1 is a perspective view of an aircraft with control surfaces, the aircraft shown in hover.
Figure 2:
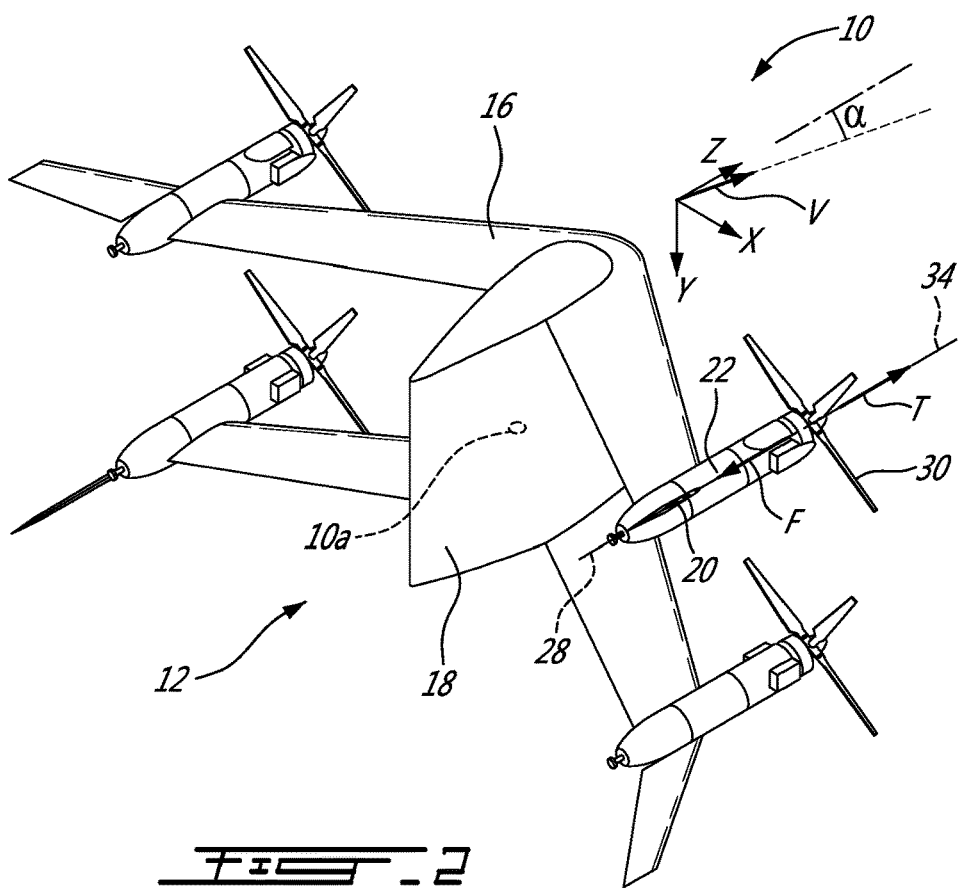
FIG. 2 is a perspective view of the aircraft of FIG. 1, the aircraft shown in forward flight.

FIGS. 1 and 2 show an aircraft 10. The aircraft 10 is of a type provided for transitioning between vertical orientation, such as during a hover flight mode shown in FIG. 1, and a horizontal orientation, such as the forward flight mode shown in FIG. 2. The aircraft 10 includes a winged body 12 and thrust-providing pod assemblies 14 (sometimes referred to herein simply as "rotor pods 14" or "pods 14") operable to controllably propel and lift the aircraft 10. The pods 14 shown in FIGS. 1 and 2 have control surfaces 20, which are displaceable relative to the bodies 22 of their respective pods 14 in order to control an attitude of the aircraft 10, when the aircraft 10 is airborne in both hover flight mode or forward flight mode. In some embodiments, any one of the pods 14 may have at least two control surfaces 20 respectively displaceable relative to its body 22.

The body 12 of the aircraft 10 includes one or more wings 16, provided as two pairs of wings 16 in FIGS. 1 and 2 spaced apart from each other along an axis of the body 12. Two wings 16 disposed on a top side of the aircraft 10 form a first pair of wings 16a. Two wings 16 disposed on a bottom side of the aircraft 10 form a second pair of wings 16b. The wings 16 extend between leading and trailing edges along a Z axis of the aircraft 10, and have a span measured along an X axis of the aircraft 10. The pairs of wings 16a, 16b are spaced apart from one another along a Y axis of the aircraft 10. The X,Y,Z axes are orthogonal to one another, and the X and Z axes define a wing plane of the wings 16. The X,Y,Z axes are bound to the aircraft 10 and move therewith, and the orientation of some of the X,Y,Z axes will change when the orientation of the aircraft 10 changes. For example, the Z axis has an upright or vertical orientation when the aircraft 10 is in hover flight mode as shown in FIG. 1, and the Z axis has a substantially horizontal orientation when the aircraft 10 is in forward flight mode as shown in FIG. 2. In FIGS. 1 and 2, the X,Y,Z axes respectively coincide with a center of gravity 10a of the aircraft 10. In the forward flight mode, as shown in FIG. 2, the Z axis is generally aligned with a velocity direction V. The Z axis and the wing plane may be oriented at an angle α relative to the velocity direction V.

The attitude of the aircraft 10 is defined relative to the X,Y,Z axes, as the rotational position of the aircraft 10 about one or more of the X,Y,Z axes. Referring to FIG. 1, when the aircraft 10 is in the hover flight mode, the yaw axis of the aircraft 10 is the Z axis, the roll axis of the aircraft 10 is the Y axis, and the pitch axis of the aircraft 10 is the X axis. Stated differently, in hovering, the aircraft 10 can yaw about the Z axis, roll about the Y axis and pitch about the X axis so as to change its attitude. Referring to FIG. 2, when the aircraft 10 is in the forward flight mode, the yaw axis of the aircraft 10 is the Y axis, the roll axis of the aircraft 10 is the Z axis, and the pitch axis of the aircraft 10 is the X axis. Thus, in forward flight, the aircraft 10 can yaw about the Y axis, roll about the Z axis, and pitch about the X axis so as to change its attitude.

The aircraft 10 in FIGS. 1 and 2 is a fixed-wing aircraft 10, arranged such that its wings 16 remain in the same position relative to a remainder of the body 12 during operation of the aircraft 10, whether on the ground or airborne. In other embodiments of the aircraft 10, the pairs of wings 16a, 16b form a unitary wing. In yet other embodiments, the aircraft 10 has a single wing 16. The aircraft 10 may thus have other configurations that differ from that shown in FIGS. 1 and 2, and may for example include more or fewer wings 16, more or fewer pods 14, and/or more or fewer control surfaces 20. It should be noted that ailerons, spoilers, flaps and slats used for airborne attitude control of typical fixed-wing aircraft may be provided on the wings 16. In other embodiments, the aircraft 10 is of a tilt-wing type, arranged such that its wings are pivotable relative to a remainder of the body 12, for example between a generally vertical orientation for take-off or landing and a generally horizontal orientation for forward flight.

The body 12 includes a fuselage 18 from which the wings 16 extend. The fuselage 18 is joined to the first pair of wings 16a at its top side and extends to its bottom side joined to the second pair of wings 16b. In the embodiment shown, the aircraft 10 is unmanned, and its fuselage 18 is configured for payload transportation. The fuselage 18 has an interior cavity that may be selectively opened and closed, for example to receive and secure the payload. In some embodiments, a portion of the fuselage 18 having the cavity is selectively detachable from a remainder of the body 12 mounted to the wings 16. In this embodiment, the center of gravity 10a of the aircraft 10 is located inside the fuselage 18 and generally disposed along a centerline of the wings 16 at a junction of a trailing edge of the wings 16 and the fuselage 18. In other embodiments, a plurality of fuselages 18 may be disposed on either sides of the Z axis. In other embodiments, the fuselage 18 is configured for passenger transportation. In yet other embodiments, the fuselage 18 is be omitted. In such other embodiments, the center of gravity 10a of the aircraft 10 may be located forward of the trailing edge of the wings 16.

Still referring to FIGS. 1 and 2, the pods 14 are paired and symmetrically disposed relative to the X and Z axes. The pods 14 form ends of the wings 16. Two pods 14 disposed on the top side of the aircraft 10 form a first pair of pods 14a. Two pods 14 disposed on the bottom side of the aircraft 10 form a second pair of pods 14b. The pods 14 are fixedly mounted to the wings 16. The first pair of pods 14a is mounted at outer ends (i.e., tips) of the first pair of wings 16a. The second pair of pods 14b is mounted at outer ends of the second pair of wings 16a. It is contemplated that in other embodiments, at least one pod 14 could be mounted at a location inward of the tips of its wings 16. In some embodiments, a single thrust-providing pod 14 disposed along the Z axis may be provided to controllably propel and lift the aircraft 10. In yet other embodiments, the aircraft 10 may be of a tilt-rotor type having pods 14 that are pivotable relative to its body 12, for example between a generally vertical orientation for take-off or landing and a generally horizontal orientation for forward flight. In some such embodiments, at least one wing 16 of the wings 16 of the aircraft 10 is pivotable relative to the body 12, and at least one pod 14 of the pods 14 is connected to the at least one wing 16 so as to be pivotable with the at least one wing 16 as it pivots relative to the body 12. In other such embodiments, the at least one pod 14 and the at least one wing 16 are pivotable one with respect to the other.

Figure 3:
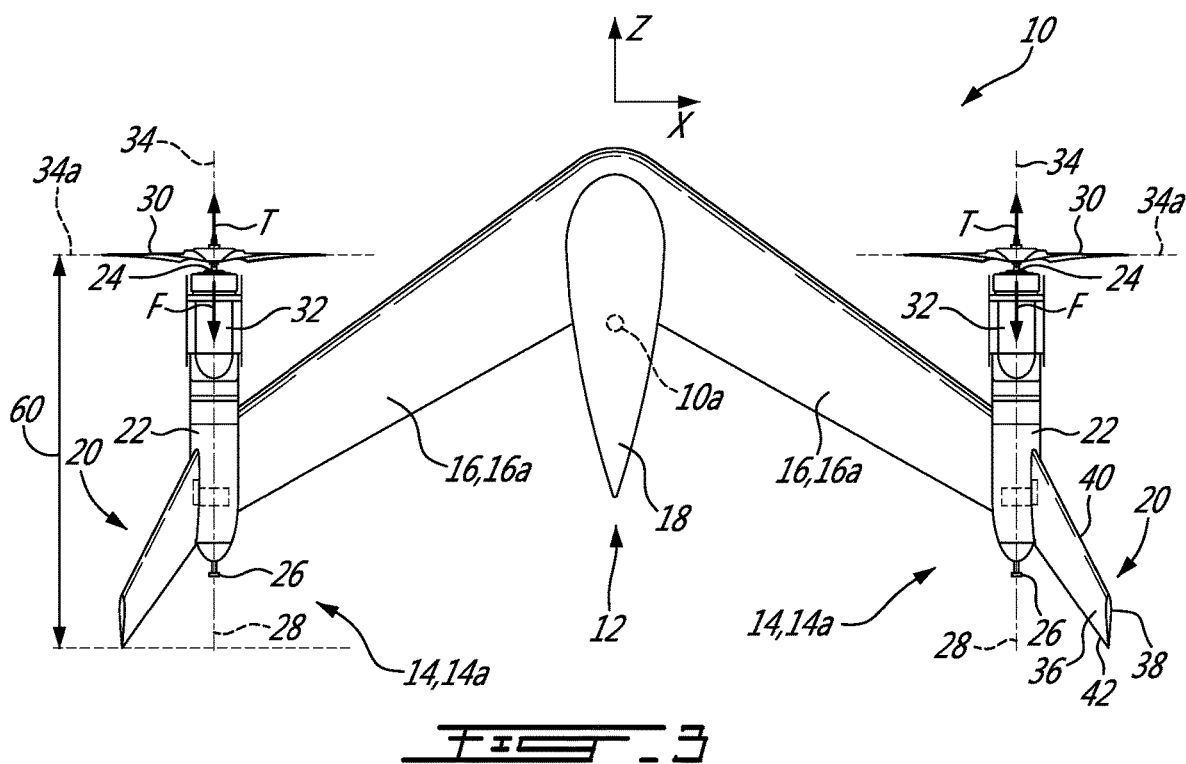
FIG. 3 is a top plan view of the aircraft of FIG. 1.

The view of the aircraft 10 provided in FIG. 3 shows the first pair of pods 14a. It should be understood that the forthcoming description of the pods 14a also applies, mutatis mutandis, to the remainder of the pods 14 of the aircraft 10. The control surface 20 is mounted to a body 22 of the pods 14a, and is positioned between a forward end 24 and an aft end 26 of the body 22. The forward end 24 of the body 22 is positioned in front of the aft end 26 of the body 22, in the velocity V direction of the aircraft 10 during forward flight. It will thus be understood that, in the embodiment of aircraft 10 shown, the forward end 24 is spaced vertically above the aft end 26 when the aircraft 10 is in hover. The body 22 extends along a longitudinal pod axis 28 of the pod 14a between the forward and aft ends 24, 26. The pod 14a also has a propeller 30 mounted to the body 22 at the forward end 24. A motor 32 is operatively connected to the propeller 30 to rotate the propeller 30. As such, the pod 14a can also be described as a rotor pod 14a. The motor 32 is housed inside the body 22. In other embodiments, the motor 32 may have a portion located outside of the body 22, for example a power source located in the adjacent wing 16 or in the fuselage 18. The motor 32 may have a gearbox arranged to selectively control a torque imparted to the propeller 30. The propeller 30 is rotatable by the motor 32 about a propeller axis 34 to accelerate a flow of air F downstream along the propeller axis 34 so as to generate a corresponding thrust force T upstream along the propeller axis 34. The propeller 30 rotates about the propeller axis 34 in a propeller plane 34a normal to the propeller axis 34. In FIG. 3, the propeller axis 34 is generally parallel to the wing plane. The propeller 30 may be arranged relative to its adjacent wing 16 such that a portion of the flow of air F generated by the propeller 30 bypasses the adjacent wing 16 and flows unimpeded toward the control surface 20. In FIG. 3, the propeller axis 34 is collinear with the longitudinal pod axis 28. In other embodiments, the propeller 30 is pivotable relative to the body 22 so as to selectively direct the thrust force T at a tilt angle relative to the wing plane. Upon pivoting the propeller 30 relative to the body 22, the tilt angle may generally correspond to that of the propeller axis 34 to the longitudinal pod axis 28. In such embodiments, the propeller axis 34 may be described as a rotor axis 34, the rotor pod 14a may be described as a tilt-rotor pod 14a, and the aircraft 10 may be described as a tilt-rotor aircraft 10.

Figure 4:
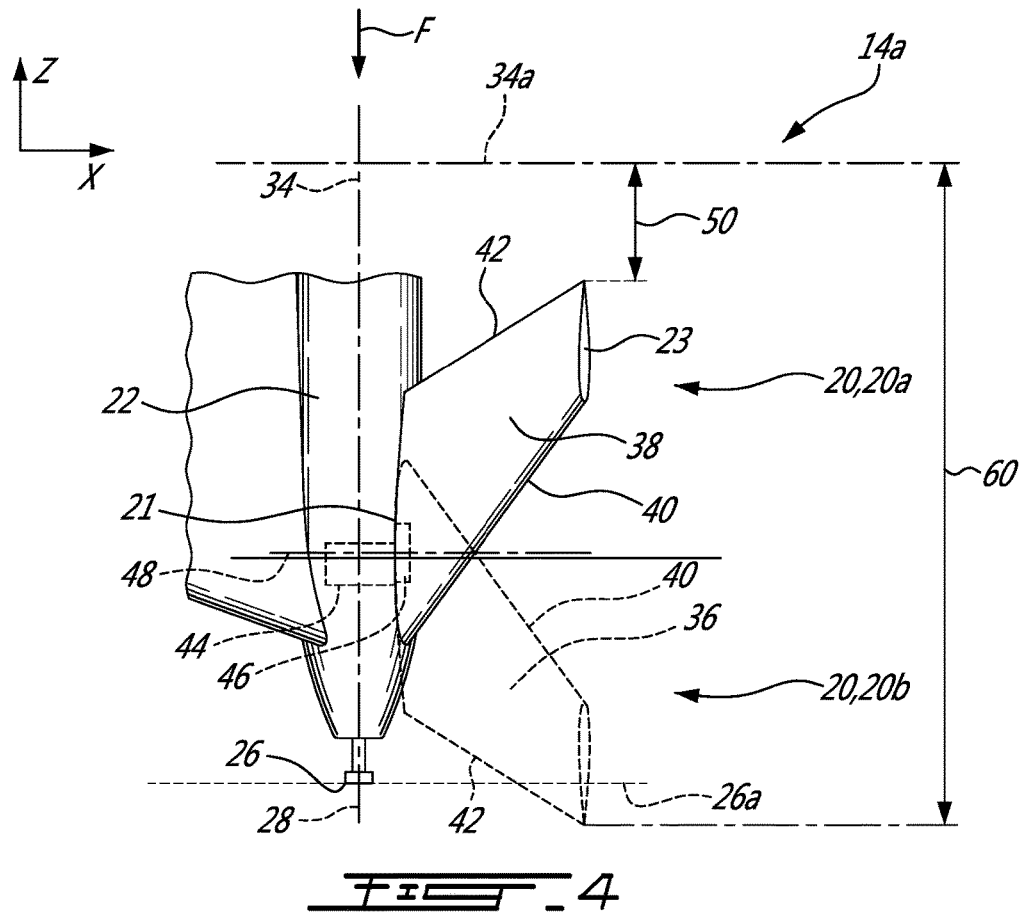
FIG. 4 is an enlarged top plan view of a rotor pod and a control surface of the aircraft of FIG. 1.

Referring to FIG. 4, the control surface 20 has a root 21 disposed proximate the body 22 and a tip 23 opposite the root 21 and spaced away from the body 22. The control surface 20 extends generally away from the longitudinal pod axis 28 as it extends from the root 21 toward the tip 23. A suction side 36 and a pressure side 38 of the control surface 20 facing away from one another respectively extend from the root 21 to the tip 23. A leading edge 40 and a trailing edge 42 of the control surface 20 respectively extend between the root 21 and the tip 23 at opposite ends thereof. An actuator 44 is joined to the body 22. A mount 46 is joined to the control surface 20 at its root 21. The actuator 44 is operatively connected to the control surface 20 to displace the control surface 20 relative to the body 22. The actuator 44 is joined to the mount 46 and arranged to displace the mount 46 with the control surface 20 relative to the body 22. In some embodiments, the mount 46 forms a part of the control surface 20. In some embodiments, the actuator 44 is a servomotor disposed inside the body 22. In other embodiments, the actuator 44 is powered by the motor 32. In other embodiments, the actuator 44 may have a portion located outside of the body 22, for example a control unit or a power source located in one of the wings 16 or in the fuselage 18.

The actuator 44 may have a gearbox arranged to selectively adjust a force or a torque imparted to the mount 46 so as to controllably displace and position of the control surface 20, for example in response to a pressure exerted to the control surface 20 as incident air flow is deflected thereby. In either of the hover and forward flight modes, positioning the control surface 20 relative to the body 22 so as to orient the control surface 20 with respect to incident air flow can affect the attitude of the aircraft 10, as explained in greater detail below.

The actuator 44 is arranged to displace the control surface 20 so as to rotate the control surface 20 about a transverse pod axis 48 of the pod 14a. The control surface 20 is thus orientable about the transverse pod axis 48. The transverse pod axis 48 is oriented generally transversely to a length of the body 22, i.e., generally transversely to the longitudinal pod axis 28. In some embodiments, the transverse and longitudinal pod axes 48, 28 intersect. In FIG. 4, the transverse pod axis 48 is along one of the radial lines extending from the longitudinal pod axis 28. In other embodiments, the transverse pod axis 48 is at an angle to the longitudinal pod axis 28. In yet other embodiments, the transverse and longitudinal pod axes 48, 28 do not intersect. In either of the hover flight and forward flight modes, the control surface 20 is controllably orientable about the transverse pod axis 48 relative to the body 22 and so as to selectively effect changes to the attitude of the aircraft 10 about the X,Y,Z axes. The orientation of the control surface 20 may be determined by the control unit of the actuator 44 as a function of flight conditions, for example the position, velocity and acceleration of the aircraft 10, the attitude of the aircraft 10, pressure borne by the control surface 20, and a rotation speed of propeller 30.

The displacement of the control surface 20 relative to the body 22 helps to effect changes to the attitude of the aircraft 10, and also helps to set or control the authority of the control surface 20 in effecting such changes. The authority of the control surface 20 is a measure of the ability or effectiveness of the control surface 20 to effect changes in the attitude of the aircraft 10, and varies as a function of at least one of the attitude of the aircraft 10 at the onset of the displacement, the position of the control surface 20 relative to the propeller 30 and the orientation of the control surface 20, all of which will now be broadly described. Hence, in order to control the authority of the aircraft 10, the control surface 20 is displaceable relative to the body 22 to positions referred to as control configurations. The control configurations are positions of the control surface 20 relative to the propeller 30 and its propeller plane 34a. In either of the control configurations, the control surface 20 is orientable about the transverse pod axis 48. The control surface 20 displaces relative to the body 22 between a first control configuration and a second control configuration. For example, the control surface 20 is closer to the propeller 30 in the first control configuration than in the second control configuration. Displacing the control surface 20 between the first and second control configurations changes the authority of the control surface 20. Thus, to achieve a comparable change in the attitude of the aircraft 10 in both the first and second control configurations, changes in the orientation of the control surface 20 in a given configuration can be less than changes made to the orientation of the control surface 20 in the alternative, because of the comparatively greater authority of the control surface 20 in the given control configuration than in the alternative. Under certain circumstances, the closer proximity of the control surface 20 in the first control configuration to the generation of the flow F of downstream air produced by the propeller 30 results in the control surface 20 having greater authority compared to when the control surface 20 is in the second control configuration and further from the generation of the flow F of downstream air by the propeller 30. For instance, aerodynamic characteristics of the propeller 30 may result in the flow F of downstream air being generally more laminar the closer it is to the propeller 30. The flow F of downstream air may exhibit less turbulence proximate the forward portion 24 of the body than aft therefrom. Also, the flow F of downstream air may scatter as it moves downstream from the propeller, such that a portion of the flow F of downstream air incident the control surface 20 may be greater in the first control configuration than in the second control configuration. Thus, displacing the control surface 20 from the first control configuration toward the second control configuration can increase an exposure of the control surface 20 to the flow F of downstream air and thus increase a pressure borne by the control surface 20.

Under certain circumstances, the position of the control surface 20 in the second control configuration being aft to that in the first control configuration results in the control surface 20 having greater authority compared to when the control surface 20 is in the first control configuration. For instance, in embodiments, displacing the control surface 20 between the first and second control positions changes a distance of the control surface 20 from the center of gravity 10a of the aircraft 10. In embodiments, the control surface 20 is in a forward most position relative to the center of gravity 10a in the first control configuration, and in an aft most position relative to the center of gravity 10a in the second control configuration. In some such embodiments, in the first control configuration, the control surface 20 extends to forward of the center of gravity 10a. In some such embodiments, displacing the control surface 20 aft from the center of gravity 10a toward the second control configuration increases a distance of the control surface 20 from the pitching axis X, and thus increases the pitching authority of the control surface 20 in inducing a moment to the aircraft 10 about the axis X upon the control surface 20 being exposed to incident air flow. In forward flight, displacement of the aircraft 10 in the velocity V direction and relative to ambient air surrounding the aircraft 10 induces a differential air flow moving in a direction opposite the velocity V direction and incident the control surface 20. Deflection of the differential air flow by the control surface 20 can induce rotation of the aircraft 10 about the pitching axis X, and displacing the control surface 20 toward the first control configuration so as to increase the distance of the control surface 20 from the axis X can increase the pitching authority of the control surface 20. In the presence of the differential air flow, displacing the control surface 20 to the second control configuration can help to maintain the aircraft 10 at a horizontal attitude or to bring the aircraft 10 to a more horizontal attitude, for example as the aircraft 10 transitions from the hovering flight mode to the forward flight mode. However, in the hovering mode, the differential air flow may be absent or may be substantially lesser than the flow F of downstream air generated by the propeller 30. Therefore, under some such hover conditions, the pitching authority of the control surface 20 can be greater in the first control configuration than in the second control configuration.

Characteristics of the displacement of the control surface 20 will now be described. For instance, the control surface 20 is displaceable relative to the body 22 by being rotatable relative to the body 22 about one or more of its axes. This relative rotational displacement may take different forms. For example, in FIG. 4, the control surface 20 is rotatable about the transverse pod axis 48 and about the longitudinal pod axis 28. Rotation of the control surface 20 about the transverse pod axis 48 causes displacement of the control surface 20 between the first and second control configurations, as explained in greater detail below, to change the authority of the control surface 20. Rotation of the control surface 20 about the transverse pod axis 48 also changes the orientation of the control surface 20 and its features (e.g. suction side 36, pressure side 38, root 21, tip 23, leading edge 40 and trailing edge 42) relative to the direction of the flow F of downstream air produced by the propeller 30. This causes a change in the angle of attack of the control surface 20, to thereby cause a change in the attitude of the aircraft 10. Rotation of the control surface 20 about the longitudinal pod axis 28 also changes the orientation of the control surface 20 and its features relative to the direction of the flow F of downstream air to cause a change in the attitude of the aircraft 10. In some such embodiments, the actuator 44, the mount 46 and the control surface 20 are arranged with respect to the body 22 such that the transverse pod axis 48 is orientable at a tilt angle relative to a notional plane of the pod 14a that is parallel to the axis X and in which lays the longitudinal pod axis 28. In some such embodiments, the transverse pod axis 48 intersects the longitudinal pod axis 28, and the control surface 20 is rotatable with the mount 46 about the longitudinal pod axis 28 so as to selectively position the transverse pod axis 48 at a desired tilt angle relative to the notional plane of the pod 14a. The tilt angle may for example be set at 45 degrees, and changing the tilt angle may be desirable to increase the authority of the aircraft 10 with respect to one or more of the axes X,Y,Z. Other types of rotational displacement of the control surface 20 relative to the body 22 are possible. In another embodiment, the control surface 20 is rotatable only about the transverse pod axis 48 to achieve changes in both authority and attitude. In another embodiment, the control surface 20 is rotatable only about the longitudinal pod axis 28 to effect changes in attitude, and is slidingly displaceable or translatable relative to the body 22 along the longitudinal pod axis 28 to achieve changes in authority. It will therefore be appreciated that in one or both of the first and second control configurations, the orientation of the control surface 20 can be changed to change the attitude of the aircraft 10.

Referring to FIG. 4, in the first control configuration, the control surface 20 is shown with reference number 20a, and the trailing edge 42 generally faces forwardly (i.e., toward the propeller 30) and the leading edge 40 generally faces rearwardly (i.e., toward the aft end 26 of the body 22). In the second control configuration, the control surface 20 is shown with reference number 20b, and the leading edge 40 generally faces forwardly and the trailing edge 42 generally faces rearwardly. The control surface 20 may be arranged relative to the propeller 30 and its adjacent wing 16 such that in either of the first and second control configurations 20a, 20b, the control surface 20 is directly downstream of the propeller 30 and clear of the adjacent wing 16. In this embodiment, the control surface 20 is rotatable by 180 degrees about the transverse pod axis 48, in either a clockwise or a counter clockwise direction, between the first and the second control configurations 20a, 20b. In other embodiments, displacing the control surface 20 between the first and second control configurations 20a, 20b involves rotating the control surface 20 by less than 180 degrees. In this embodiment, in the first control configuration 20a, the tip 23 of the control surface 20 is located forward of the center of gravity 10a of the aircraft 10. In the first control configuration 20a, the center of pressure of the control surface 20 may be generally aligned with the center of gravity 10a along the axis Z. In the first control configuration 20a, a distance between the tip 23 and the propeller 30 is a first distance 50. In this embodiment, in the first control configuration 20a, the control surface 20 is entirely forward of the aft end 26. In this embodiment, in the second control configuration 20b, the tip 23 is located aft of the aft end 26 of the body 22. In the second control configuration 20b, the center of pressure of the control surface may be aft of the center of gravity 10a. Further, in the second control configuration 20b, the distance between the tip 23 and the propeller 30 is a second distance 60. The second distance 60 is greater than the first distance 50, meaning that the tip 23 of the control surface 20 is spaced further from the propeller 30 in the second control configuration 20b than in the first control configuration 20a. The greater distance from the propeller 30 of the control surface 20 in the second control configuration 20b may result in a reduced authority for the control surface 20, when compared to the first control configuration 20a, at least under certain circumstances pertaining to the hovering flight mode as described above. In this embodiment, in the second control configuration 20b, the control surface 20 is located entirely aft of the center of gravity 10a of the aircraft 10. Thus, at least under certain circumstances pertaining to the forward flight mode, the greater distance from the propeller 30 of the control surface 20 in the second control configuration 20b can result in an increased authority for the control surface 20, when compared to the first control configuration 20a.

The control surface 20 and the propeller 30 are arranged relative to one another such that operating the propeller 30 directs the flow of air F downstream to the control surface 20 alongside its suction and/or pressure sides 36, 38, and displacing the control surface 20, such as by rotating the control surface 20 about the transverse pod axis 48 can deflect the flow of air F along the suction and/or pressure sides 36, 38 so as to change the lift generated by the control surface 20, such that an aerodynamic force is exerted against the center of pressure of the control surface 20. Thus, the control surface 20 can be displaced to control an orientation and a magnitude of the aerodynamic force to selectively impart at least one of a rolling, a pitching and a yawing moment to the aircraft 10 so as to control its attitude during different operating modes.

Non-limiting examples of a displacement of the control surface 20 effecting changes in authority and the attitude of the aircraft 10 are now described. In an embodiment, in one or both of the first and second control configurations 20a, 20b, the control surface 20 may be rotated about one or both of the longitudinal pod axis 28 and the transverse pod axis 48 such that a plane defined by the suction and/or pressure sides 36,38 is parallel to the wing plane defined by the wings 16. This orientation of the control surface 20 may be a default orientation of the control surface 20 in both hover and forward flight modes. The aerodynamic force that can be imparted to the aircraft 10 by rotating the control surface 20 about the transverse pod axis 48 away from this default orientation of the control surface 20 in both the first and second control configurations 20a, 20b may cause a pitching moment about the X axis (in both hover and forward flight modes). In some embodiments, controlling the attitude of the aircraft 10 includes rotating the control surface 20 in a range of 0 to 30 degrees clockwise and counter-clockwise relative to the default orientation parallel to the wing plane.

In another embodiment, in one or both of the first and second control configurations 20a, 20b, the control surface 20 may be rotated about one or both of the longitudinal pod axis 28 and the transverse pod axis 48 to orient it relative to the flow F of downstream air generated by the propeller 30. The chosen orientation of the control surface 20 generates an aerodynamic force that can be imparted to the aircraft 10 to cause rotation of the aircraft 10 about one or more of a pitch axis (the axis X in both the hover and forward flight modes), a roll axis (the axis Y in the hover flight mode, and the axis Z in the forward flight mode), and a yaw axis (the axis Z in the hover flight mode, and the axis Y in the forward flight mode). It will therefore be appreciated that the mere displacement of the control surface 20 between the first and second control configurations 20a, 20b is sufficient to effect a change in attitude of the aircraft 10 about one or more of its pitch, yaw, and roll axes, in either one of the hover and forward flight modes.

There is also disclosed a method of operating the aircraft 10 by displacing the control surface 20 to control the attitude of the aircraft 10. As will be described, displacing the control surface 20 changes an exposure of either the suction side 36 or the pressure side 38 to the flow of air F produced by the propeller 30 so as to controllably impart a moment to the aircraft 10 about at least one of its roll, pitch, and yaw axes, in both hover and forward flight modes. Displacing the control surface 20 also changes the authority of the control surface 20, and thus affects its authority or effectiveness in roll, pitch, and yaw. Furthermore, attitude control and authority control may be exerted differently depending on the operating mode so as to desirably affect performance.

Still referring to FIG. 4, upon operating the aircraft 10 in either one of the hovering and forward flight modes, controlling either one of the roll, the pitch and the yaw of the aircraft 10 includes displacing the control surface 20 relative to the body 22. In either flight mode, rotating the control surface 20 about its transverse pod axis 48 increases the exposure of either the suction side 36 or the pressure side 38 of the control surface 20 to the flow of air F, thus increasing at least one of a rolling, a pitching and a yawing moment imparted by the control surface 20 to the aircraft 10.

In either flight mode, the control surfaces 20 on different pods 14 may be displaced in a coordinated manner to control the attitude of the aircraft 10. For instance, paired control surfaces 20, i.e., control surfaces 20 of rotor pods 14 disposed on opposite sides of either one of the axes X,Y,Z of the aircraft 10, may be rotated synchronously and in a coordinated manner about their respective transverse pod axes 48 to induce rotation of the aircraft 10 about one of the axes X,Y,Z. For example, paired control surfaces 20 disposed on opposite sides of the axis Z can be displaced in coordination to induce rotation about the axis X by being rotated about their respective transverse pod axes 48. Asynchronous rotation of control surfaces 20 can also instead induce rotation about more than one of the axes X,Y,Z of the aircraft 10.

Upon operating the aircraft 10 in the hover flight mode, the yaw axis is the axis Z and is generally vertical, i.e., normal to a ground surface (schematically represented by 26a), the pitch axis is axis X, and the roll axis is the axis Y being generally horizontal. In some embodiments, controlling the roll of the aircraft 10 in hover flight mode includes rotating the control surface 20 clockwise about the transverse pod axis 48 when in the first control configuration 20a, i.e., so as to increase the exposure of the pressure side 38 to the flow of air F. In some embodiments, controlling the roll of the aircraft 10 in the hover flight mode includes rotating the control surface 20 counter-clockwise when in the first control configuration 20a about the transverse pod axis 48, i.e., so as to increase the exposure of the suction side 36 to the flow of air F. In some embodiments, controlling the roll of the aircraft 10 in hover flight mode includes rotating the control surface 20 about the transverse pod axis 48 by up to 30 degrees clockwise and up to 30 degrees counter clockwise from the first control configuration 20a. Other degree values are possible.

Upon operating the aircraft 10 in the hover flight mode, the thrust force T generated by the propeller 30 is the main aerodynamic force keeping the aircraft 10 airborne. It should be noted that in some embodiments, the flow of air F accelerated rearward of the propeller 30 to generate the thrust force T may become increasingly turbulent as it moves away from the propeller 30. Thus, in the hover flight mode, positioning the control surface 20 as close as possible to the propeller 30, such as in the first control configuration 20a, may desirably affect at least one of the yaw and pitch authority of the control surface 20. Indeed, reducing the distance defined between the tip 23 of the control surface 20 and the propeller plane 34a can increase at least one of a yaw authority and a pitch authority of the control surface 20. Therefore, in the hover flight mode, the changes to the orientation of the control surface 20 when it is in the first control configuration 20a that are needed to yaw the aircraft 10 may be less than the changes to the orientation of the control surface 20 when it is in the second control configuration 20b required to make the same yaw movement. Thus, in both the forward and hover flight modes, the control surface 20 in the first control configuration 20a may generate an aerodynamic force that is greater than the aerodynamic force generated by the control surface 20 in the second control configuration 20b, for a given orientation of the control surface 20, because of the increase authority of the control surface 20 in the first control configuration 20a. For example, in the first control configuration 20a where the tip 23 is at the first distance 50 from the propeller 30, rotating the control surface 20 by 10 degrees about the transverse pod axis 48 exerts about 50 pounds of aerodynamic force, while in the second control configuration 20b where the tip 23 is at the greater second distance 60 from the propeller 30, rotating the control surface 20 by 10 degrees exerts about 20 pounds of aerodynamic force.

Upon operating the aircraft 10 in the forward flight mode, the aircraft 10 is oriented such that its roll axis (Z axis) and pitch axis (X axis) are generally horizontal and parallel to the ground surface 26a, and the yaw axis (Y axis) is generally vertical. In flight, velocity differences between the aircraft 10 and the surrounding air through which the aircraft 10 moves may result in an air flow (i.e., a differential airflow) being greater than the flow F generated by the propeller 30. A lift force exerted by the differential air flow alongside a suction side of the wings 16 may be the main aerodynamic force keeping the aircraft 10 airborne. The differential air flow may also be disturbed adjacent the propeller 30. The control surface 20 is arranged relative to the body 22 such that displacing the control surface 20 from the first control configuration to the second control configuration increases the distance between the tip 23 and the propeller 30. The method of operating the aircraft 10 also includes progressively displacing the control surface 20 from the first control configuration 20a to the second control configuration 20b as the aircraft 10 transitions to the forward flight mode from either one of the hover flight mode or from takeoff. Conversely, the method also includes progressively displacing the control surface 20 from the second control configuration 20b to the first control configuration 20a as the aircraft 10 transitions from the forward flight mode to either one of the hover flight mode or to landing.

In some embodiments, the method also includes rotating the control surface 20 about the longitudinal pod axis 28 either clockwise or counter clockwise so as to position the control surface 20 at a desired tilt angle relative to the wing plane so as to cause a change in the attitude of the aircraft 10. The control surface 20 may also be rotated about the longitudinal pod axis 28 to a tilt angle determined based on aerodynamic loads borne by the aircraft 10.

FIG. 5 shows the aircraft 10 with another embodiment of the control surface 200. The control surface 200 is displaceable relative to the body 22 between the first control configuration 20a and the second control configuration 20b.

The control surface 200 is translatable relative to the body 22. The control surface 200 is translatable between a first linear position (represented by 200a) and a second linear position (represented by 200b). The control surface 200 is closer to the forward end 24 in the first linear position 200a than it is in the second linear position 200b. In some embodiments, displacing the control surface 200 between the first and second control configurations 20a, 20b includes linearly moving or sliding the control surface 200 between the first and second linear positions 200a, 200b. An actuator 440 of the pod 14 is operatively connected to the control surface 200 to translate the control surface 200 between the first and second linear positions 220a, 220b. A mount 460 is joined to the control surface 200 at its root 210. The mount 460 is translatably connected to the actuator 440 to be translated with the control surface 200 by the actuator 440. The actuator 440 may have a gearbox arranged to selectively adjust a force imparted to the mount 460 to translate the mount 460, for example in response to a variation in pressure borne by the control surface 200.

In FIG. 5, the actuator 440 is operatively connected to the control surface 200 to rotate the control surface 200 about the transverse pod axis 480 of the pod 14 between different angular orientations. The actuator 440 is thus arranged so as to translate the transverse pod axis 480 as it translates the mount 460, such that the control surface 200 is rotatable about the transverse pod axis 480 upon being positioned in either of the first and second linear positions 200a, 200b or as it is being translated therebetween. In some embodiments, displacing the control surface 200 between the first and second control configurations 20a, 20b includes translating the control surface 200 between the first and second linear positions 200a, 200b and pivoting the control surface 200 between two opposite angular orientations. The control surface 200 is arranged downstream of the propeller 30. A distance 500 between a tip 230 of the control surface 200 and the propeller plane 34a increases as the control surface 200 is linearly displaced from the first linear position 200a to the second linear position 200b. The control surface 200 is arranged relative to the body 22 such that, in at least the hover flight mode, translating the control surface 200 from the second linear position 200b to the first linear position 200a reduces the distance 500, thereby increasing the authority of the control surface 20.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft, comprising:
a wing;
a rotor pod mounted to the wing, the rotor pod including a body having a forward end and an aft end, and extending along a longitudinal pod axis;
a propeller mounted to the body of the rotor pod at the forward end; and
a control surface mounted to the body of the rotor pod downstream of the propeller and extending outwardly from the body, the control surface displaceable relative to the body between a first control configuration and a second control configuration, the control surface being further from the propeller in the second control configuration than in the first control configuration, the control surface rotatable relative to the body about a transverse pod axis extending transversely to the longitudinal pod axis to orient a pressure side or a suction side of the control surface toward the propeller to induce at least one of a roll, a pitch and a yaw of the aircraft.

2. The aircraft of claim 1, wherein the control surface has a leading edge and a trailing edge extending outwardly from the body, the control surface being rotatable to position one of the leading edge and the trailing edge facing forwardly.

3. The aircraft of claim 1, wherein the control surface is rotatable about the transverse pod axis by 180 degrees.

4. The aircraft of claim 1, wherein the rotor pod includes an actuator operatively connected to the control surface to displace the control surface relative to the body.

5. The aircraft of claim 1, wherein the control surface is clear of the wing.

6. The aircraft of claim 1, wherein in the first configuration, the control surface is rotatable about the transverse pod axis between a first range of angular positions to control an attitude of the aircraft, the first range including a first angular position in which a leading edge of the control surface faces rearwardly and, in the second configuration, the control surface is rotatable about the transverse pod axis within a second range of angular positions to control the attitude of the aircraft, the second range including a second angular position in which the leading edge faces forwardly.

7. The aircraft of claim 1, wherein the control surface has a root disposed proximate the body and a tip disposed outward of the body opposite the root, and leading and trailing edges respectively extending between the root and the tip, the leading edge facing away from the propeller and the tip being closer to the propeller than the root in the first control configuration, the leading edge facing toward the propeller and the root being closer to the propeller than the tip in the second control configuration.

8. The aircraft of claim 7, wherein in the first control configuration, the tip is located forward of a center of gravity of the aircraft and in the second configuration, the tip is located aft of the center of gravity.

9. The aircraft of claim 1, wherein the control surface is translatable along the longitudinal pod axis relative to the forward and aft ends to displace the control surface between the first and second control configurations.

10. The aircraft of claim 1, wherein the control surface is rotatable about the longitudinal pod axis.

11. The aircraft of claim 1, wherein the wing is a first wing, the rotor pod is a first rotor pod, and the control surface is a first control surface, the aircraft having a second wing in a same plane as the first wing, a second rotor pod mounted to the second wing, and a second control surface mounted to the second rotor pod and extending outwardly therefrom, the second control surface being displaceable relative to the second rotor pod independently of the first control surface.

12. An aircraft, comprising:
a wing;
a rotor pod mounted to the wing, the rotor pod including a body having a forward end and an aft end, and extending along a longitudinal pod axis;
a propeller mounted to the body of the rotor pod at the forward end; and
a control surface mounted to the body of the rotor pod downstream of the propeller and extending outwardly from the body, the control surface being translatable relative to the body between and relative to the forward and aft ends between a first control configuration and a second control configuration, the control surface being further from the propeller in the second control configuration than in the first control configuration to vary an authority of the control surface.

13. The aircraft of claim 12, wherein the control surface is rotatable relative to the body, the control surface having a leading edge and a trailing edge extending outwardly from the body, one of the leading edge and the trailing edge facing forwardly upon being in the first control configuration and rearwardly upon being in the second control configuration.

14. The aircraft of claim 13, wherein the control surface is rotatable about a transverse pod axis extending transversely to the longitudinal pod axis to selectively orient a pressure side or a suction side of the control surface toward the propeller to induce at least one of a roll, a pitch and a yaw of the aircraft.

15. The aircraft of claim 14, wherein in the first control configuration, the control surface is rotatable about the transverse pod axis between a first range of angular positions to control an attitude of the aircraft, the first range including a first angular position in which the leading edge of the control surface faces rearwardly and, in the second control configuration, the control surface is rotatable about the transverse pod axis within a second range of angular positions to control the attitude of the aircraft, the second range including a second angular position in which the leading edge faces forwardly.

16. The aircraft of claim 12, wherein the control surface has a root disposed proximate the body and a tip disposed outward of the body opposite the root, and a leading edge and a trailing edge respectively extend between the root and the tip, the leading edge facing away from the propeller and the tip being closer to the propeller than the root in the first control configuration, the leading edge facing toward the propeller and the root being closer to the propeller than the tip in the second control configuration.

17. The aircraft of claim 16, wherein in the first control configuration, at least part of the tip is located aft of the aft end of the body.

18. A method of operating an aircraft including a wing and a rotor pod mounted to the wing, the rotor pod having a control surface, the method comprising: rotating the control surface about an axis transverse to the rotor pod between a first control configuration and a second control configuration to selectively orient a pressure side or a suction side of the control surface toward a rotor of the rotor pod to control at least one of a roll, a pitch and a yaw of the aircraft; and translating the control surface along a longitudinal axis of the rotor pod to vary distance between the control surface and the rotor.

19. The method of claim 18, wherein the translating of the control surface includes translating the control surface to the first control configuration and rotating the control surface about the axis to a first angular position to control the at least one of the roll, the pitch, and the yaw movement of the aircraft, and translating the control surface to the second control configuration and rotating the control surface about the axis to a second angular position different from the first angular position to control said roll, pitch, and yaw movement of the aircraft.

20. The method of claim 18, comprising rotating the control surface about the longitudinal axis of the rotor pod when the control surface is in either one of the first control configuration and the second control configuration.

* * * * *